United States Patent [19]

Black

[11] 4,032,084
[45] June 28, 1977

[54] HELICOPTER TYPE AIRCRAFT WITH GROUND EFFECT STRUCTURE

[76] Inventor: John O. Black, 18094 Parkside, Detroit, Mich. 48221

[22] Filed: Mar. 11, 1976

[21] Appl. No.: 666,080

[52] U.S. Cl. .......................... 244/17.23; 244/12 R; 244/23 C

[51] Int. Cl.² ........................................ B64C 27/08

[58] Field of Search ............ 244/23 R, 23 B, 23 C, 244/12 R, 12 B, 12 C, 12 A, 17.21, 17.23, 17.25, 17.27, 12.1, 12.2, 12.3, 12.4, 56; 180/127

[56] References Cited

UNITED STATES PATENTS

| | | | |
|---|---|---|---|
| 3,084,888 | 4/1963 | Hertel | 244/56 X |
| 3,155,343 | 11/1964 | Black | 244/17.27 X |
| 3,184,183 | 5/1965 | Piasecki | 244/23 B |
| 3,357,656 | 12/1967 | Peterson | 244/17.23 |
| 3,486,577 | 12/1969 | Jackes | 180/127 X |
| 3,889,902 | 6/1975 | Madet | 244/23 B X |

Primary Examiner—Trygve M. Blix
Assistant Examiner—Barry L. Kelmachter
Attorney, Agent, or Firm—Harness, Dickey & Pierce

[57] ABSTRACT

The aircraft in the nature of a helicopter is movable in a vertical direction when being raised from the ground or landing thereon. The body of the aircraft is toroidal in form, that is to say, the shape of a doughnut having a central aperture. The central aperture has a jet engine mounted therein providing a downward thrust on the centerline of the body aperture. A substantial ground effect is obtained by the use of panels which are movable from the underface of the body to a vertical position enclosing the central area therebeneath. Supports extend upwardly and outwardly from the central jet engine having a pivotally mounted turbine on each of the upper ends, the extending shafts from which have an elongated helicopter type of propeller mounted thereon. A ram, or other type of motor, is employed for tilting one or both of the turbines and propellers from an angular position to a position of greater tilt to provide a forward movement to the body.

7 Claims, 5 Drawing Figures

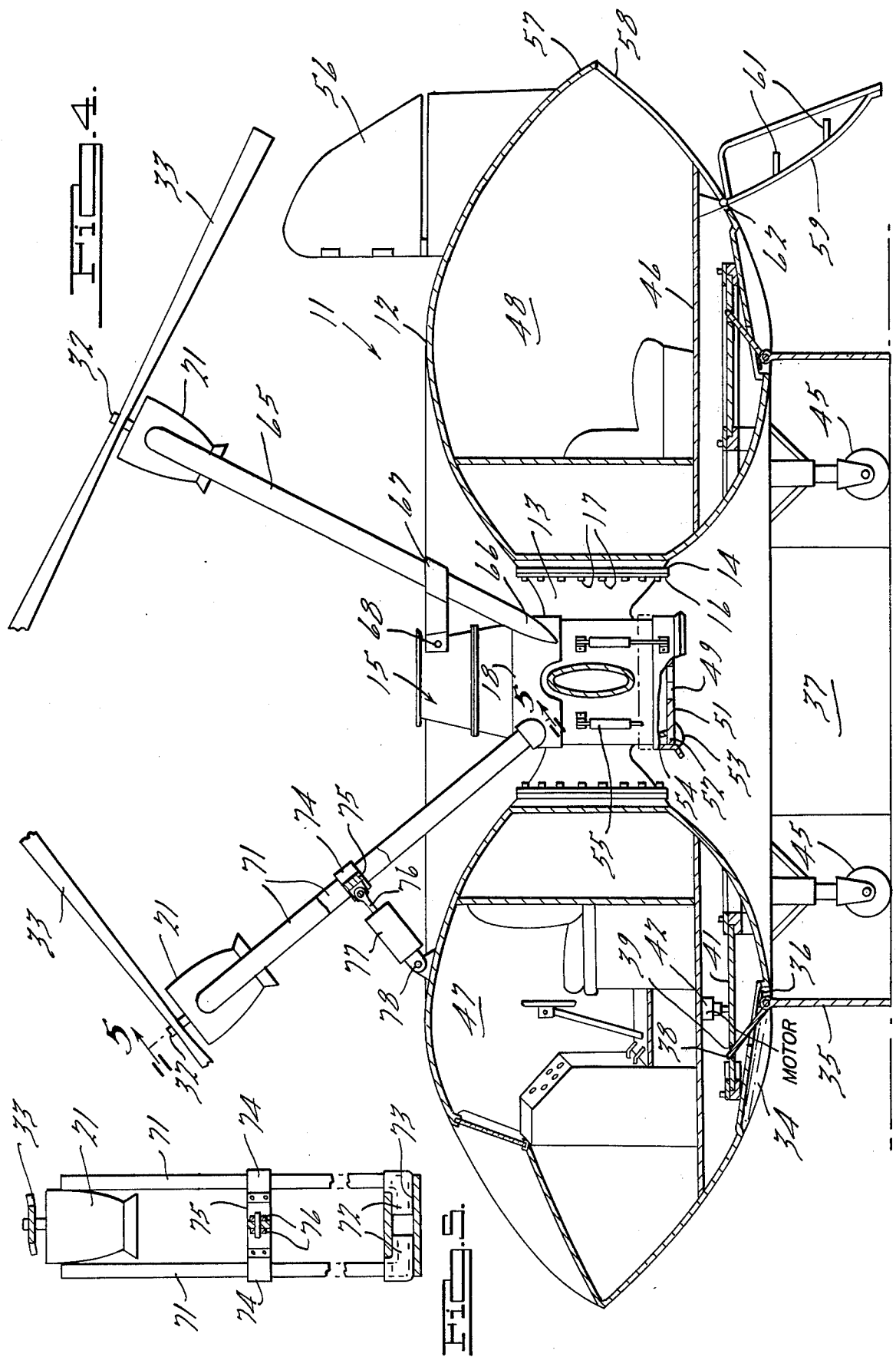

HELICOPTER TYPE AIRCRAFT WITH GROUND EFFECT STRUCTURE

BACKGROUND OF THE INVENTION

Reference may be had to U.S. Pat. No. 3,155,343 and the art cited therein for a disclosure of the known prior art.

SUMMARY OF THE INVENTION

The invention pertains to a helicopter-like airplane having a toroidal or doughnut shaped body provided with a central opening in which a jet engine is suspended. The underface of the body has a plurality of recesses therein containing hinged panels which are lowered by suitable mechanism from the recesses to a vertical position enclosing the central area beneath the body in which the force from the jet engine is directed for producing a ground effect which substantially increases the lift to the body. A pair of oppositely directed angularly disposed arms extend upwardly from the central aperture on each of which a turbine is supported for driving a propeller for directing air downwardly through the central opening in the body. The shaft of the turbine may be swung to a position up to substantially 45° in the direction of the front of the helicopter to provide forward movement thereto. A floor within the body provides passenger, storage, service, cockpit and like areas, the area beneath the floor being available for carrying the baggage and the like. A hinged stair unit diametrically disposed from the front pilot's cockpit of the body provides entrance and egress thereinto and therefrom.

The bottom face of the body has recesses for a plurality of panels which may be moved therefrom to a vertical position for enclosing an area having its center aligned with the center of the engine. The skirting effect provided by the panels produces a ground effect to the force provided by the jet engine to quickly raise the body from the ground. A casing on the jet engine is in communication with the pressure chamber thereof and a pair of conduits extending therefrom to hollow trunnions of the turbines. The pressure from the conduits produces the operation of the turbines for rotating the propellers and providing lift to the body. When the body is raised a predetermined distance, sufficient to eliminate the ground effect initially employed in the raising movement, the panels are retracted and closure plates are moved over the end of the jet engine to raise the gas pressure delivered to the turbines to increase their driving force and have the propellers assume an increased amount of lift as compared to the amount of lift provided by the jet engine when the body has been lifted from the ground. Thereafter, one of the propellers is tilted relative to the body to provide forward movement to the body which is directed to the right or left by a rudder disposed in the air stream from the propellers.

BRIEF DESCRIPTION OF THE DRAWINGS

FIG. 4 is a view of structure similar to that illustrated in FIG. 1, showing another form thereof, and FIG. 5 is a sectional view of the structure illustrated in FIG. 4, taken on the line 5—5 thereof.

DESCRIPTION OF THE PREFERRED EMBODIMENT

Figures 1, 2:
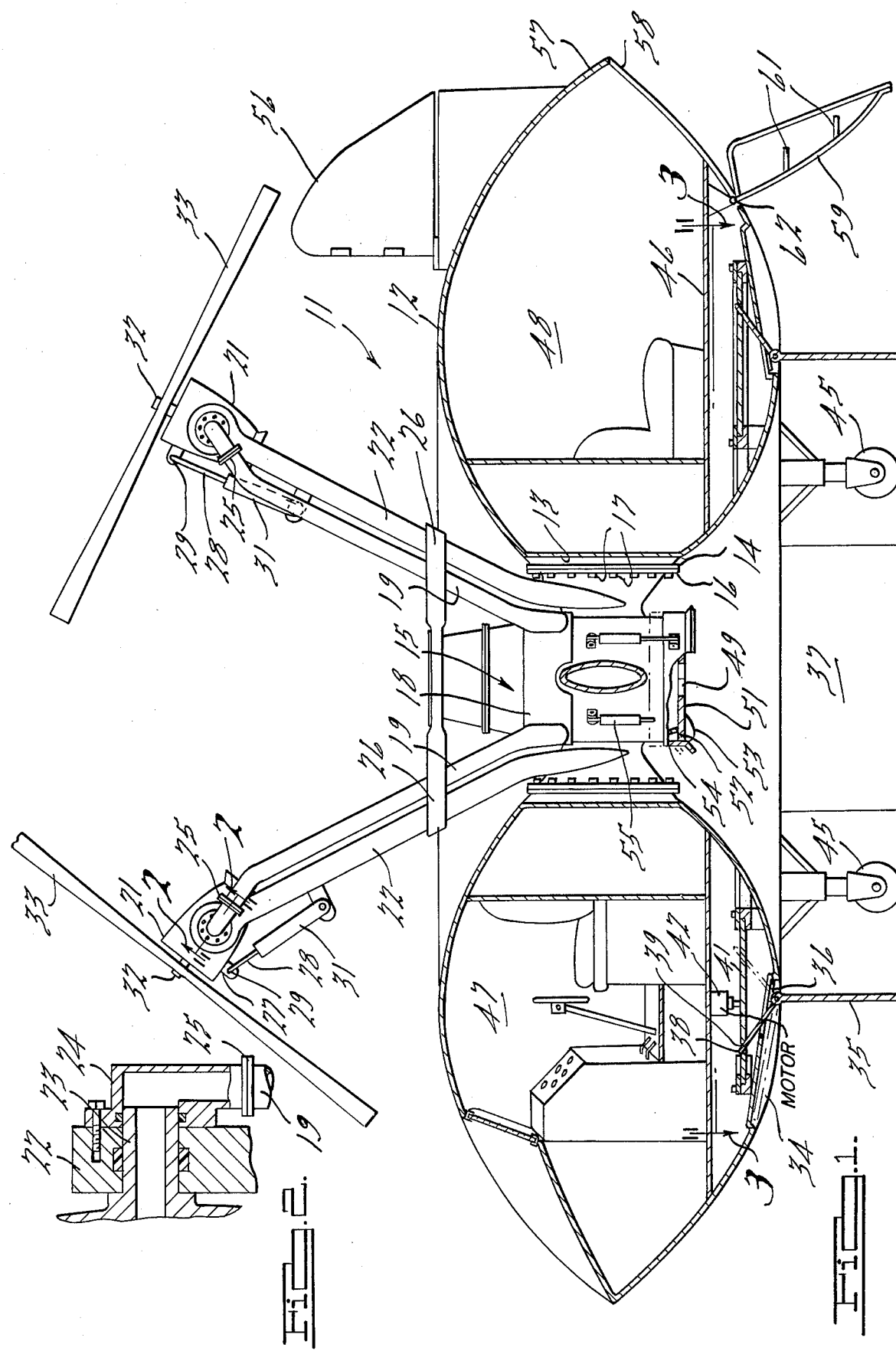
FIG. 1 is a broken sectional view of a helicopter-type airplane embodying features of the present invention.
FIG. 2 is an enlarged sectional view of the structure illustrated in FIG. 1, taken on the line 2—2 thereof.
Figure 3:
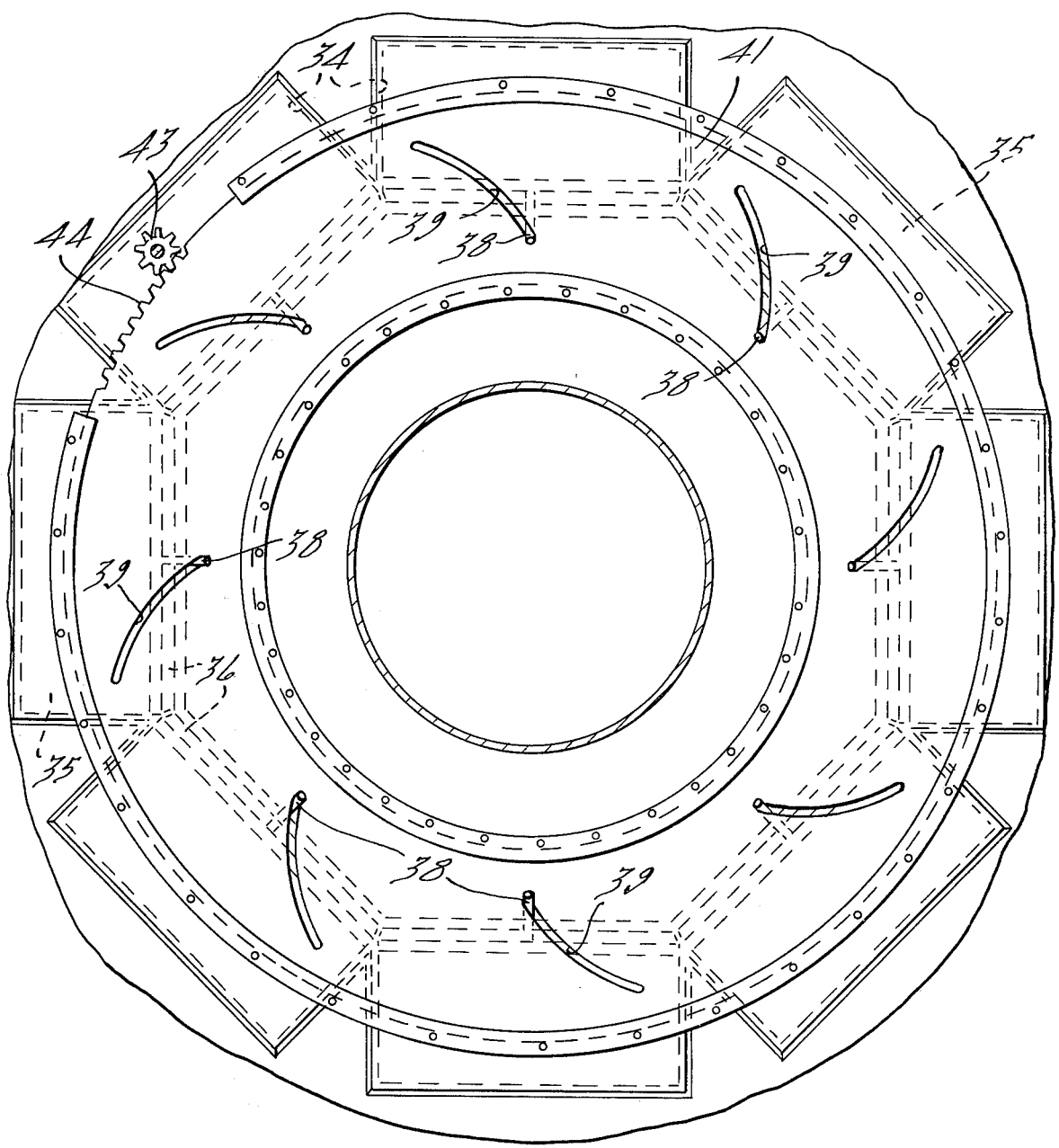
FIG. 3 is a broken sectional view of the structure illustrated in FIG. 1, taken on the line 3—3 thereof.

The helicopter 11 has a body 12 of toroidal form having a central aperture 13 containing four supporting flanges 14. A jet engine 15 has four flanges 16 which mate with the flanges 14 and are secured together by a plurality of screws 17. A casing 18 is mounted on the jet engine 15 disposed in communication with the pressure chamber of the engine. Conduits 19 extend from the casing 18 for directing the gases under pressure therewith to turbines 21 which are pivotally supported on arms 22 which extend upwardly and outwardly from the jet engine 15 on which they are supported. The turbines 21 are secured on each of their trunnions 23 for pivotal movement on the arms 22. One of the trunnions 23 of each turbine is hollow having the ends covered by a cap 24 secured to the projecting ends of the conduits 19 through a flange engagement 25 secured together by screws or bolts (not illustrated).

The two supporting arms 22 are braced by a member 26 which is secured to the upper end of the jet engine 15. The outer casing on the turbines 21 has extending arms 27 to which the end of a piston rod is secured by a pivot 29, the rod being moved to and from cylinders 31 in the normal manner. It will be noted that the turbine 21 on the right-hand arm 22 has its shaft 32 in position located approximately 30° from the horizontal while the shaft 32 on the lefthand turbine is disposed at approximately 45° thereto. As shown on the drawing, the righthand shaft drives a propeller 33 in a plane at an angle of approximately 30° to the horizontal in one direction while the lefthand shaft drives a propeller 33 in the other direction in a plane tilted approximately 45° to the horizontal. Both of the propellers direct the air downwardly toward the central aperture 13 to provide lift to the body and a forward component of movement is provided by the lefthand propeller when tilted at a a greater angle.

The underface of the body 12 has recesses 34 therein for receiving panels 35 which are supported on pivots 36 for movement to and from the recesses. The panels are illustrated in vertical position to enclose an area 37 about the centerline of the jet engine 15. Operating arms 38 on the panels 35 extend through cam slots 39 in a rotatable plate 41 which moves the panels 35 into or from the recesses 34. A motor 42 is herein illustrated as providing the power for driving a pinion 43 which moves the plate 41 through the engagement of teeth 44 in a section of the peripheral edge of the plate. The body 12 when on the ground is supported on four suspended wheels 45 which may or may not be retractable in a manner known in the art.

A floor 46 is provided within the body 12 the forward end having a pilot's cabin 47, the areas either side thereof forming a passenger compartment 48 as well as service, food, storage and other types of compartment areas. The outlet end 49 of the jet engine 15 has plates 51 hanging downwardly therefrom on hinges 52 and provided with cams 53 which are engaged by a sleeve 54 on the engine when moved downwardly by a plurality of rams 55. This swings the plates 51 to close off the discharge end of the jet engine 15 leaving the central part open to provide some lift while transferring power through the conduits 19 to the turbines 21 to have their propellers 33 produce the major portion of the lift after the jet engine 15 has raised the body 12 a substantial distance from the ground. The panels 35 are swung back into the recesses 34 and one or both of the turbines are tilted to produced a forward movement to the body. The exact direction of this movement is controlled by a rudder 56 which is disposed in the path of air from the tilted propeller or propellers 33. The shaft 32 for the turbines is disposed at such an angle as to prevent the propellers from touching when the turbines are pivoted thus permitting the use of propellers of substantial length. The rear end 57 of the body has a passenger opening 58 which is closed by a door panel 59 having steps 61 thereon. The panel 59 is mounted on hinge means 62 and when moved to enclose the opening 58 suitable latch means (not shown) is employed for retaining it in closed latched position.

A further form of turbine and propeller mounting is illustrated in FIGS. 4 and 5 wherein a pair of spaced tubular supporting elements 65 have their lower end secured to the casing 18 at 66 in conducting relation therewith and with the turbine 21 fixedly mounted therebetween at the upper ends in conducting relation therewith. A band 67 connects the two supporting elments 65 together and to the engine 15 by a flange 68. The propeller 33 is retained in fixed position on the turbine shaft 32 and in position to deliver air into the opening 13 in the center of the body. Like tubular elements 71 have facing tubular ends 72 which extend within an aperture 73 on one side of the casing 18 retained in pivoted sealed relation thereto when interconnected by a band 74. The band has central arm 75 to which one end of a piston rod 76 is pivoted, the opposite end being secured on a piston movable within a cylinder 77 having the supported end secured to the body by a pivot 78. The outward movement of the piston rod 76 from the cylinder 77 is limited to prevent the engagement of the tips of the propeller 33 driven by the lefthand turbine 21 from engaging the tip of the propeller 33 driven by the turbine 21 secured to the supported elements 65. Similarly, the piston rod 76 can be drawn into the cylinder 77 a fixed amount so as to prevent the tips of the propeller from striking the body when producing a component of forward movement thereto. In either of the arrangements as illustrated in FIGS. 1 or 4, the air from the propellers 33 is always directed toward the openings 13 at the center of the body to provide the greatest amount of lift which is maintained when the lefthand propeller is tilted to provide a component of forward movement to the body.

The arrangement is believed unique in trapping expelled gas from the engine and delivering it downwardly from the central opening in the body which is skirted to confine the gas and provide a substantial force for raising the body from the ground. As this ground effect becomes minimized as the body is raised, the closing of the outlet of the engine produces a substantial increase in the delivery of gas to the turbine which drives the propellers at a greater speed so that they can provide the major amount of lift for the body therafter. The forward movement of the body is produced by the forward tilting of the lefthand propeller which still provides lift when directing the air downwardly through the central opening 13 of the body. In either of the embodiments of FIGS. 1 or 4, the arrangement is such that the driven propellers are of sufficient length to support the load of the body and are so arranged as to provide a forward component movement without having the propeller tips interfere with each other.

I claim:

1. In a doughnut-shaped aircraft, an aircraft body, a jet engine extending in a vertical direction supported by the center of said body, said jet engine having a combustion chamber from which gas is expelled downwardly at the exhaust end, conduit means extending upwardly from opposite sides of said chamber, a pair of gas turbines supported by the upper ends of said conduit means in a manner to be driven by the gas from said chamber, a propeller supported and driven by each said turbine, and means for adjusting the position of said turbines for changing the direction of flow of air produced by said propellers.

2. In an aircraft as recited in claim 1, wherein said turbine position adjusting means in formed by conduit means being pivoted relative to the combustion chamber, and means for moving said conduit means for adjusting the position of the propellers relative to each other and the combustion chamber.

3. In an aircraft as recited in claim 1, wherein said turbine position adjusting means is formed by said turbines being pivoted on the outer end of said conduit means, and means for angularly adjusting said turbines on said conduit means for adjusting the position of the propellers relative to each other and said conduit means.

4. In an aircraft as recited in claim 1, wherein a plurality of horizontally disposed panels on the underside of the body pivot downwardly adjacent to the ground to form a vertical containing wall for enclosing an area about the discharge from the jet engine to increase the ground effect therefrom for assisting in the initial raising of the body when the jet engine is operated and said body is near the ground.

5. In an aircraft as recited in claim 1, wherein closure means is provided at the exhaust end of the jet engine, and means for operating said closure means for increasing the amount of gas within said conduit means.

6. In an aircraft as recited in claim 1, wherein a revolvable plate is provided in said body having cam engagement with arms extending outwardly of the panels for changing the position of said panels when said plate is revolved.

7. In an aircraft as recited in claim 6, wherein motor means revolves said plate in either direction of rotation.

* * * * *